United States Patent
Wang et al.

(10) Patent No.: US 10,459,976 B2
(45) Date of Patent: Oct. 29, 2019

(54) METHOD, APPARATUS AND SYSTEM FOR APPLYING AN ANNOTATION TO A PORTION OF A VIDEO SEQUENCE

(71) Applicant: CANON KABUSHIKI KAISHA, Tokyo (JP)

(72) Inventors: Ij Eric Wang, Denistone (AU); Jie Xu, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 15/192,795

(22) Filed: Jun. 24, 2016

(65) Prior Publication Data

US 2017/0004140 A1 Jan. 5, 2017

(30) Foreign Application Priority Data

Jun. 30, 2015 (AU) ................. 2015203661

(51) Int. Cl.
*G06F 16/78* (2019.01)
*G06F 3/0488* (2013.01)

(52) U.S. Cl.
CPC ........ *G06F 16/7867* (2019.01); *G06F 3/0488* (2013.01)

(58) Field of Classification Search
CPC ............................ G06F 16/7867; G06F 3/0488
See application file for complete search history.

(56) References Cited

U.S. PATENT DOCUMENTS

| | | | |
|---|---|---|---|
| 6,195,458 B1 | 2/2001 | Warnick | |
| 6,546,405 B2 | 4/2003 | Gupta | |
| 6,956,593 B1 | 10/2005 | Gupta | |
| 7,506,262 B2 | 3/2009 | Gupta | |
| 7,688,889 B2 | 3/2010 | Krause | |
| 8,640,030 B2 | 1/2014 | Kulas | |
| 2002/0059584 A1* | 5/2002 | Ferman | G11B 27/105 725/34 |

(Continued)

OTHER PUBLICATIONS

Bay, Herbert, et al. Surf: Speeded up robust features, 2006, pp. 404-417, vol. 110—No. 3, Computer Vision and Image Understanding (CVIU)—ECCV 2006.

(Continued)

*Primary Examiner* — Thai Q Tran
*Assistant Examiner* — Sunghyoun Park
(74) *Attorney, Agent, or Firm* — Canon U.S.A., Inc. IP Division

(57) ABSTRACT

A method, system and apparatus for applying an annotation to a portion of a video sequence. The method comprises the steps of receiving the video sequence in real-time during capture of the video sequence, monitoring in real-time a plurality of signals associated with the video sequence, and receiving an indication associated with a spatial area of interest of at least one frame during capture of the video sequence. The method further comprises selecting, from the plurality of monitored signals, a temporal portion of one of the plurality of monitored signals for annotation, said selection being based upon at least the spatial area of interest and a temporal variation measure in at least one of the plurality of monitored signals, applying an annotation to a portion of the video sequence corresponding to the selected temporal portion; and storing the annotation in an annotation record associated with the video sequence.

26 Claims, 11 Drawing Sheets

(56) References Cited

U.S. PATENT DOCUMENTS

| | | |
|---|---|---|
| 2005/0081159 A1 | 4/2005 | Gupta |
| 2006/0036740 A1 | 2/2006 | Hagale |
| 2006/0227997 A1* | 10/2006 | Au ................... G06K 9/00771 382/103 |
| 2006/0239645 A1* | 10/2006 | Curtner ........... G08B 13/19606 386/228 |
| 2007/0189623 A1* | 8/2007 | Ryu ................... H04N 19/117 382/243 |
| 2007/0222553 A1* | 9/2007 | Lim ...................... H04N 5/232 340/3.1 |
| 2009/0282087 A1 | 11/2009 | Muller |
| 2010/0150522 A1 | 6/2010 | Schmehl |
| 2010/0169906 A1 | 7/2010 | Takahashi |
| 2010/0299630 A1* | 11/2010 | McCutchen ............ H04N 7/18 715/803 |
| 2011/0021234 A1* | 1/2011 | Tibbitts ................ H04W 48/04 455/517 |
| 2012/0139839 A1* | 6/2012 | Krukar .................... G11B 27/11 345/158 |
| 2014/0363043 A1* | 12/2014 | Bernal ............... G06K 9/00771 382/103 |
| 2017/0076571 A1* | 3/2017 | Borel ............... G08B 13/19669 |

OTHER PUBLICATIONS

Lowe, David G. Distinctive image features from scale-invariant keypoints, 2004, pp. 91-110, vol. 60—No. 2, International Journal of Computer Vision.

* cited by examiner

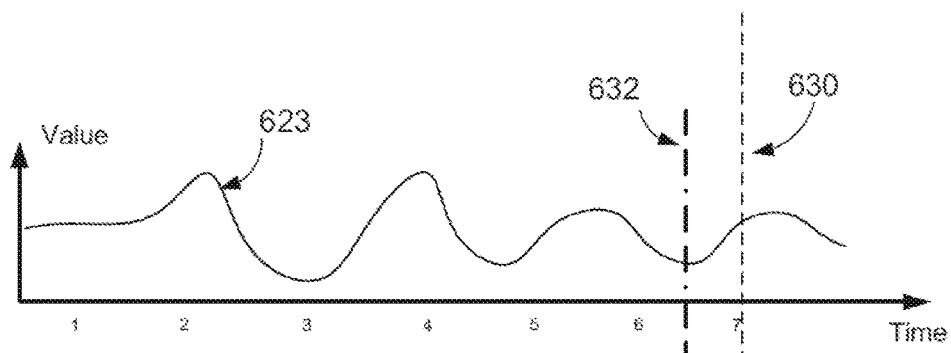
Fig. 6C(i)
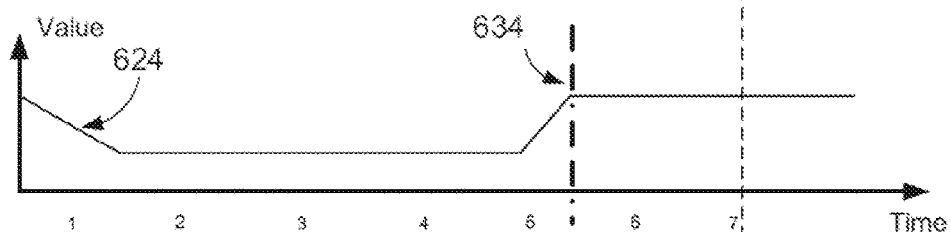
Fig. 6C(ii)
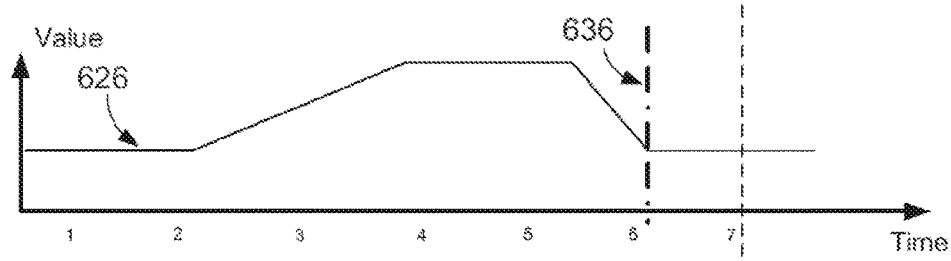
Fig. 6C(iii)
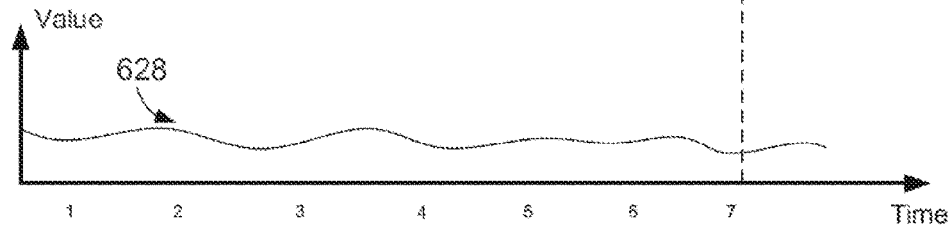
Fig. 6C(iv)

METHOD, APPARATUS AND SYSTEM FOR APPLYING AN ANNOTATION TO A PORTION OF A VIDEO SEQUENCE

REFERENCE TO RELATED APPLICATION(S)

This application claims the benefit under 35 U.S.C. § 119 of the filing date of Australian Patent Application No. 2015203661, filed 30 Jun. 2015, hereby incorporated by reference in its entirety as if fully set forth herein.

TECHNICAL FIELD

The present invention relates to cinematography and digital cinema. In particular, the present invention relates to a method apparatus and system for applying an annotation to a portion of a video sequence.

BACKGROUND

The advent of digital imaging technology has altered the behaviour of the film industry, in the sense that more and more films are produced digitally. Digital cinematography, the process of capturing video content as digital content items, has become increasingly prevalent for film production.

In addition to simplifying the transition of source materials between production and post-production, digital cinematography has improved the work flow of film production. For example, digital cinematography has enabled on-set monitoring, which means directors, clients, and others on set are able to watch the live video sequences of every shot during film production. While live review can provide useful information to the director, there is presently no easy way for this information to be passed on to the post-production stage. This means that the director must carry over the knowledge of the shot to the post-production process. If the director does not carry over all knowledge of each shot to the post-production stage, information loss can occur.

Given the real-time nature of live video streams, it is desirable that annotations be added to captured video sequences with minimum interaction time so as not to impede the monitoring. However, it is challenging for the director to specify the details of annotations within a short time. Voice annotations cannot be used during capture. Voice annotations have limited ability to capture or be associated with a video sequence.

A need exists to facilitate applying annotations to a video sequence.

SUMMARY

It is an object of the present disclosure to substantially overcome, or at least ameliorate, at least one disadvantage of present arrangements.

A first aspect of the present disclosure provides a processor-implemented method of applying an annotation to a portion of a video sequence, said method comprising the steps of: receiving the video sequence in real-time during capture of the video sequence; monitoring in real-time a plurality of signals associated with the video sequence; receiving an indication associated with a spatial area of interest of at least one frame during capture of the video sequence, selecting, from the plurality of monitored signals, a temporal portion of one of the plurality of monitored signals for annotation, said selection being based upon at least the spatial area of interest and a temporal variation measure in at least one of the plurality of monitored signals; applying an annotation to a portion of the video sequence corresponding to the selected temporal portion; and storing the annotation in an annotation record associated with the video sequence.

In one implementation, the processor-implemented method further comprises determining a region of interest of the at least one frame of the video sequence using the spatial area of interest, wherein the selection of the temporal portion is based upon at least the region of interest and the temporal variation measure.

In another implementation, the region of interest comprises the spatial area of interest and a portion of the at least one video frame having content associated with content of the spatial area of interest.

In another implementation, each the plurality of monitored signals is associated with a spatial region of the at least one video frame.

In another implementation, the spatial region of the at least one video frame is a portion of the video frame.

In one implementation, the spatial region of the at least one video frame is the entire video frame.

In another implementation, the selection indication is a touch gesture received by a touch screen displaying the video sequence.

In another implementation, the temporal variation measure is based upon a monitored signal having a most recent time of change prior to receiving the selection indication.

In another implementation, the temporal variation measure is based upon a monitored signal having a greatest relative transition in a time period prior to receiving the selection indication.

In another implementation, the selected temporal portion starts at a transition time of the selected monitored signal.

In another implementation, the selected temporal portion ends at a further transition of the selected monitored signal.

In another implementation, the processor-implemented further comprises determining a category of the annotation from the selected temporal portion.

In another implementation, a subject of the annotation is identified in the at least one frame by matching a type of the indication to the selected temporal portion.

In another implementation, the plurality of monitored signals include at least one of signals relating to image capture apparatus motion, image capture apparatus zoom, image capture apparatus frame rate, video image lighting, video image colour, video image blur, video image edge density, video image corner density, video image face appearance, video image character motion, video image object motion, video image ambient noise and video image dialog.

In another implementation, an area of the annotation comprises the spatial area of interest.

In another implementation, the area of the annotation further comprises a region of the at least one frame having similar texture content to the spatial area of interest.

In another implementation, the area of the annotation further comprises a region of the at least one frame having a similar motion signature to the spatial area of interest.

A further aspect of the present disclosure provides a computer-readable medium having computer program stored thereon for applying an annotation to a portion of a video sequence, said program comprising: code for receiving the video sequence in real-time during capture of the video sequence; code for monitoring in real-time a plurality of signals associated with the video sequence; code for receiving an indication associated with a spatial area of interest of at least one frame during capture of the video sequence, code for selecting, from the plurality of monitored signals, a temporal portion of one of the plurality of monitored signals for annotation, said selection being based upon at least the spatial area of interest and a temporal variation measure in at least one of the plurality of monitored signals; code for applying an annotation to a portion of the video sequence corresponding to the selected temporal portion; and code for storing the annotation in an annotation record associated with the video sequence.

A further aspect of the present disclosure provides an apparatus for applying an annotation to a portion of a video sequence, the apparatus comprising: means for receiving the video sequence in real-time during capture of the video sequence; means for monitoring in real-time a plurality of signals associated with the video sequence; means for receiving an indication associated with a spatial area of interest of at least one frame during capture of the video sequence, means for selecting, from the plurality of monitored signals, a temporal portion of one of the plurality of monitored signals for annotation, said selection being based upon at least the spatial area of interest and a temporal variation measure in at least one of the plurality of monitored signals; means for applying an annotation to a portion of the video sequence corresponding to the selected temporal portion; and means for storing the annotation in an annotation record associated with the video sequence.

A further aspect of the present disclosure provides system for applying an annotation to a portion of a video sequence, the system comprising: a memory for storing data and a computer program; a processor coupled to the memory for executing said computer program, said computer program comprising instructions for: receiving the video sequence in real-time during capture of the video sequence; monitoring in real-time a plurality of signals associated with the video sequence; receiving an indication associated with a spatial area of interest of at least one frame during capture of the video sequence, selecting, from the plurality of monitored signals, a temporal portion of one of the plurality of monitored signals for annotation, said selection being based upon at least the spatial area of interest and a temporal variation measure in at least one of the plurality of monitored signals; applying an annotation to a portion of the video sequence corresponding to the selected temporal portion; and storing the annotation in an annotation record associated with the video sequence.

BRIEF DESCRIPTION OF THE DRAWINGS

One or more embodiments of the invention will now be described with reference to the following drawings, in which:

FIGS. 6C(i) to 6C(iv) show an example of how a monitored signal is selected based on the spatial area of interest identified from an annotation gesture;

DETAILED DESCRIPTION INCLUDING BEST MODE

Figure 1:
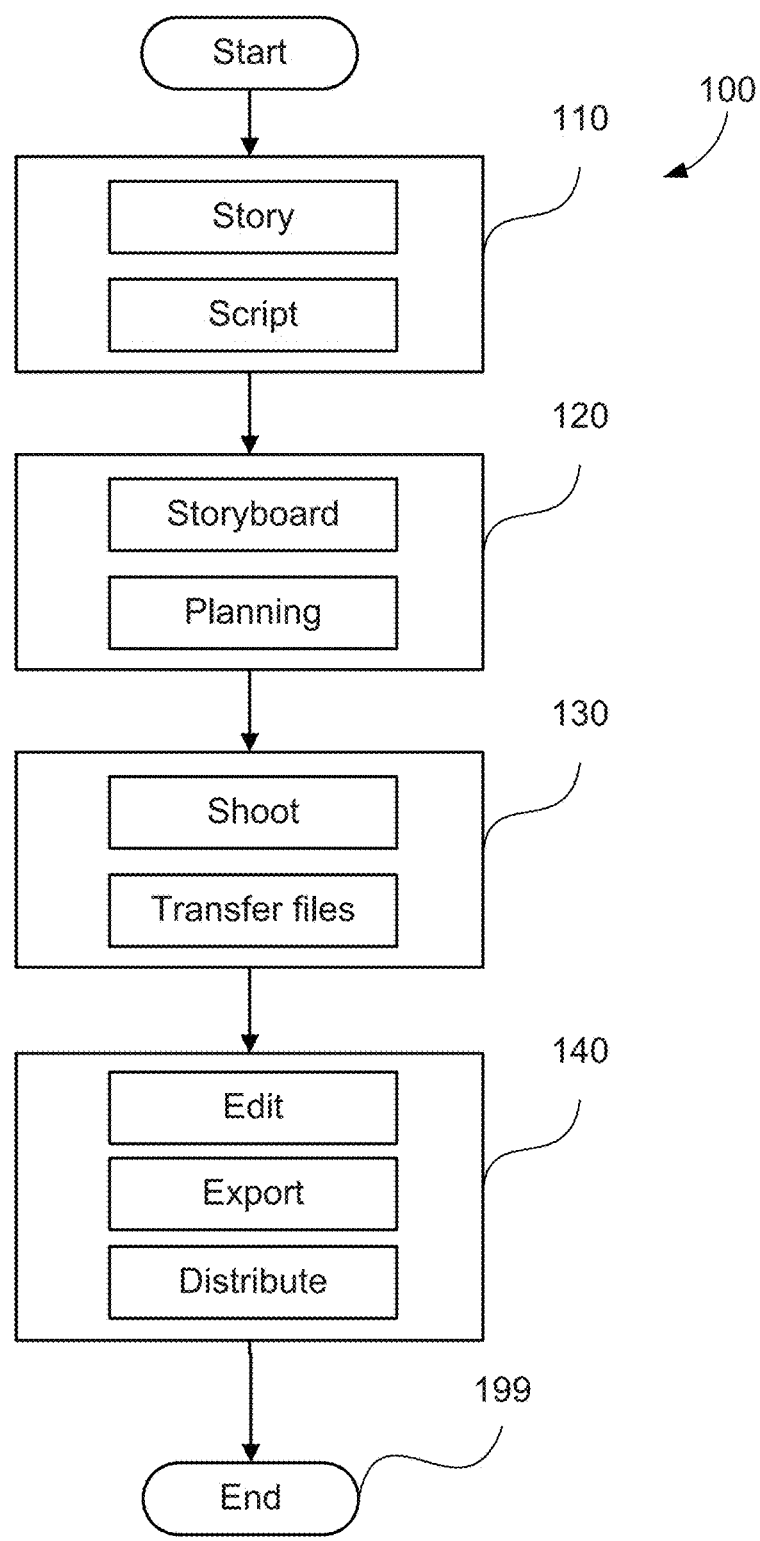
FIG. 1 shows a prior art method typical in film production.

Narrative films, which are probably the most widely screened films in theatres, are one type of film product that tells a story. The goal of narrative film making is to compose a sequence of events in audio and/or visual form based on a written story. With the advent of digital imaging technology, digital cinematography, being high-quality acquisition of video data using digital cinema cameras during film production, has become increasingly widespread for narrative film making FIG. 1 shows a method 100 representative of a workflow used in digital cinematography for narrative film making The method 100 mainly comprises the following stages: a development stage 110, a pre-production stage 120, a production stage 130, and a post-production stage 140. The stages 110 to 140 are typically executed in sequence to produce a final film.

The pre-production stage 120 follows the planning stage 110. At the development stage 110, a film producer selects a story and develops a script with the help of a screenwriter. During the production stage 100, key elements such as financing, principal cast members, directors, and cinematographers for the film are confirmed.

At the pre-production stage 120, storyboards, which are visual images helping communicating ideas for the script, are developed. Furthermore, during the pre-production stage 120, each step of actually making the film is designed and planned.

Following the pre-production stage 120 is the production stage 130. At the production stage 130, raw footage for the narrative film is generated. In particular, shots, which are short recorded video sequences, are captured or recorded for different scenes of the film. Shots are recorded using an image capture apparatus, such as a digital video camera. A shot is a basic unit of the production stage 130 corresponding to a continuous recording of a scene of the narrative film from the time the image capture apparatus starts recording until the imaging apparatus stops recording. It is common for multiple shots for any given scene to be acquired at the production stage 130. Acquiring multiple shots for a given scene helps ensure there is footage of sufficient quality for use in the post-production stage 140. Each alternative shot captured is referred to as a take. Each shot captured is stored with associated metadata relating to the captured video sequence.

Following the production stage 130 is the post-production stage 140. At the post-production stage 140, the captured shots are edited and then exported to various formats such as Digital Versatile Disc (DVD), Blue-ray Disc (BD), Holographic Versatile Disc (HVD), etc. for distribution. The editing process of the post-production stage 140 consists of reviewing the content and assembling the narrative film. Metadata created in the production stage 130 is utilized for editing at the post-production stage 140. For example, colour grading may be utilized to enhance or alter the colour of a particular scene of the acquired shots, in light of a cinematographer's or director's notes on colours.

Variations of the method 100 of FIG. 1 are possible in practice. However, film making typically employs pre-production (planning), production (capture) and post-production (editing) stages in some form.

During the production stage 130, directors of the film review the captured shots and record notes in report sheets. The notes may include possible issues or general comments on the shots. In digital cinematography, reviewing the acquired shots may be supported by on-set monitoring, enabled by wireless encoders and mobile devices. One example is wireless on-set monitoring to a tablet device such as an iPad™ using Teradek Cube™. The Teradek Cube™ acts as a Wi-Fi (IEEE 802.11) hotspot, which an iPad™ can connect to and communicate via. Once the Teradek Cube™ has been connected to the image capture apparatus via a connection such as a HDMI/HD-SDI connection, the Teradek Cube™ transmits live video (live capture of shots) from the image capture apparatus to the iPad™ with little delay. Such allows monitoring of the take, live on the iPad™.

Annotations that the directors are interested in can be classified into a number of categories. Typical categories of annotations may comprise performance, camera (image capture apparatus) parameters and quality. The performance category includes annotations relating to characters of the narrative film. Example annotation types include script, voice and character positioning. Camera parameter annotations typically include annotation types such as framing and zoom speed. Framing refers to selection of what to include in the scene captured using the camera. Expressive qualities of framing include an angle of the camera to an object of, the scene an aspect ratio of the projected image, and the like. Zooming means a change of focus length of a lens of the camera while the shot is in progress. Different effects may be created by different zooming speed. For example, zooming in creates a feeling of seemingly "approaching" a subject of the shot while zooming out makes audience feel that they are seemingly "distancing" the subject. Quality annotation types relate to issues of quality of the video sequence captured by the camera such as blur and focus. Different quality requirements may affect the camera movements. For example, a smooth camera pan may allow the scene to be sharp enough for the audience to observe, whereas a fast pan may create motion blur to the scene. Such information may be used in adjusting camera movement when making the next shot. The abovementioned annotations may provide some guidance at the production stage 130 as to how to improve shooting the next shot, or at the post-production stage 140 to improve editing.

In the pre-production stage 130, a type of the production will be specified. Production types include, for example wedding, drama, TV commercial, and company training and the like. Different production types may require different annotations. For example, for shooting wedding videos, special annotations may be required for marking special moments such as cake cutting and exchange of rings. Similarly, TV commercial productions may require designated annotations on marking continuity of an associated story flow. Given the large variety of annotations that a director may wish to record, it would be advantageous to provide a means for capturing different annotations to prevent loss of information between the production stage 130 and the post-production stage 140. It would be useful to have a streamlined means for recording annotations on a live stream of video while a shot is being captured. If the annotations cannot be made in near real-time, completion of the production method 100 will be unnecessarily extended.

An issue with the captured video sequence may be restricted to a particular spatial region and time. It would therefore be advantageous to allow directors to record an annotation for a portion of a video sequence. An example annotation would specify attributes of the annotation such as annotation type, annotation subject, associated temporal and spatial region. Annotation types refer to the types for annotation described above, while annotation subjects relate to description or content of the annotation. Such attributes are hereafter collectively referred to as 'semantics of an annotation'.

It is useful to implement a touch-to-annotate operation in the production stage as touch-to-annotate is convenient to the user (e.g., director) for reviewing and editing video sequence.

A range of single and multi-touch gestures are known and widely supported by mobile touch screen based devices like the iPad™ and include such things as a tap, double tap, a pinch, a two finger rotate, stroking out a line, multi-finger swipe and the like. Despite the convenience of the touch-to-annotate operation, some multi-touch gestures, e.g., a tap, have far shorter operative duration than the gesture's underlying semantics. It is therefore desirable to have a method to determine the semantics of annotation intelligently.

A need exists to facilitate creation of annotations during digital film production. The arrangements described determine semantics of annotations by monitoring temporal properties of (i) underlying video signals and (ii) spatial properties of a multi-touch gesture.

Figure 9A:
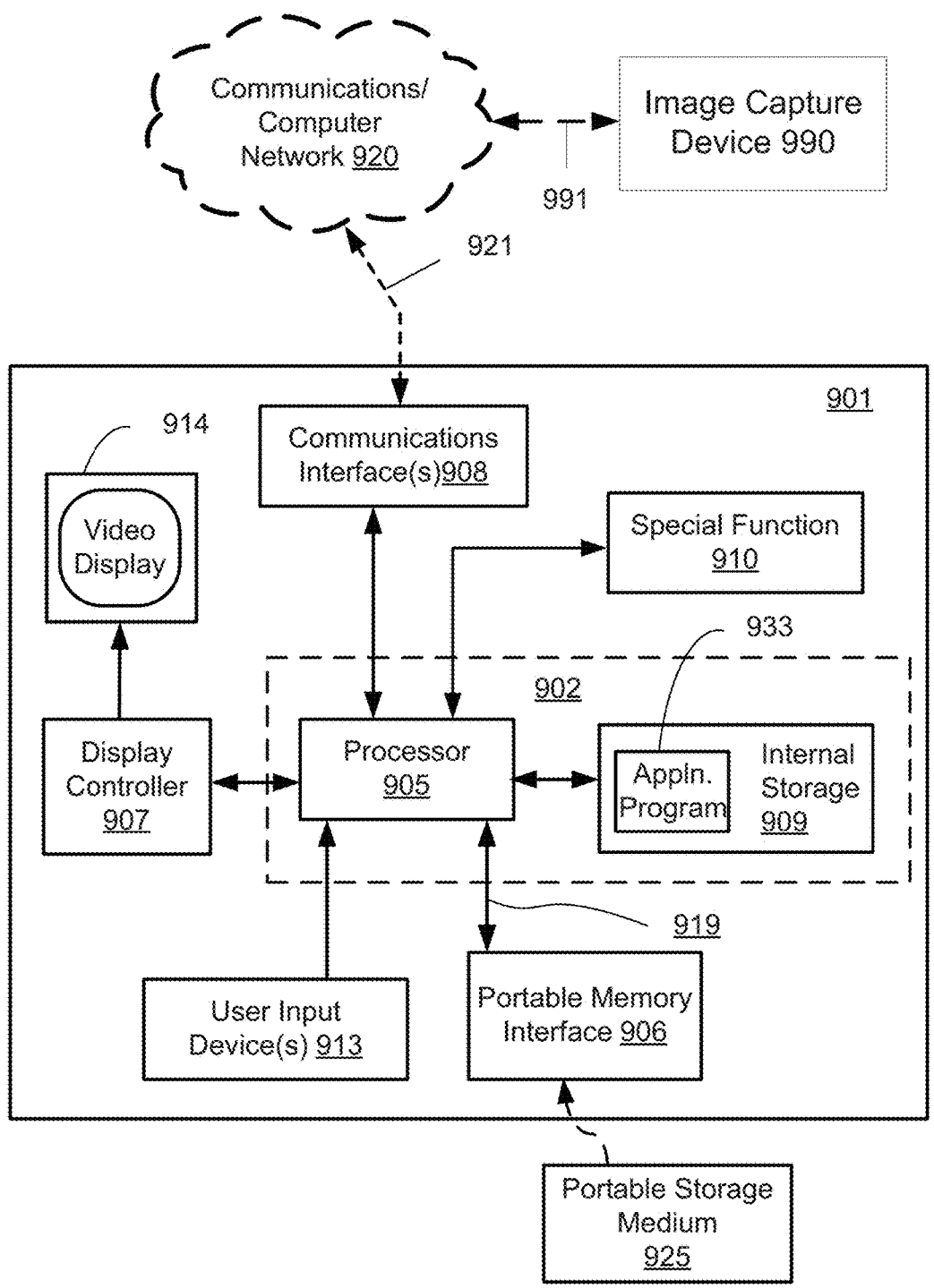
FIGS. 9A and 9B collectively form a schematic block diagram representation of an electronic device upon which described arrangements can be practised.
Figure 9B:
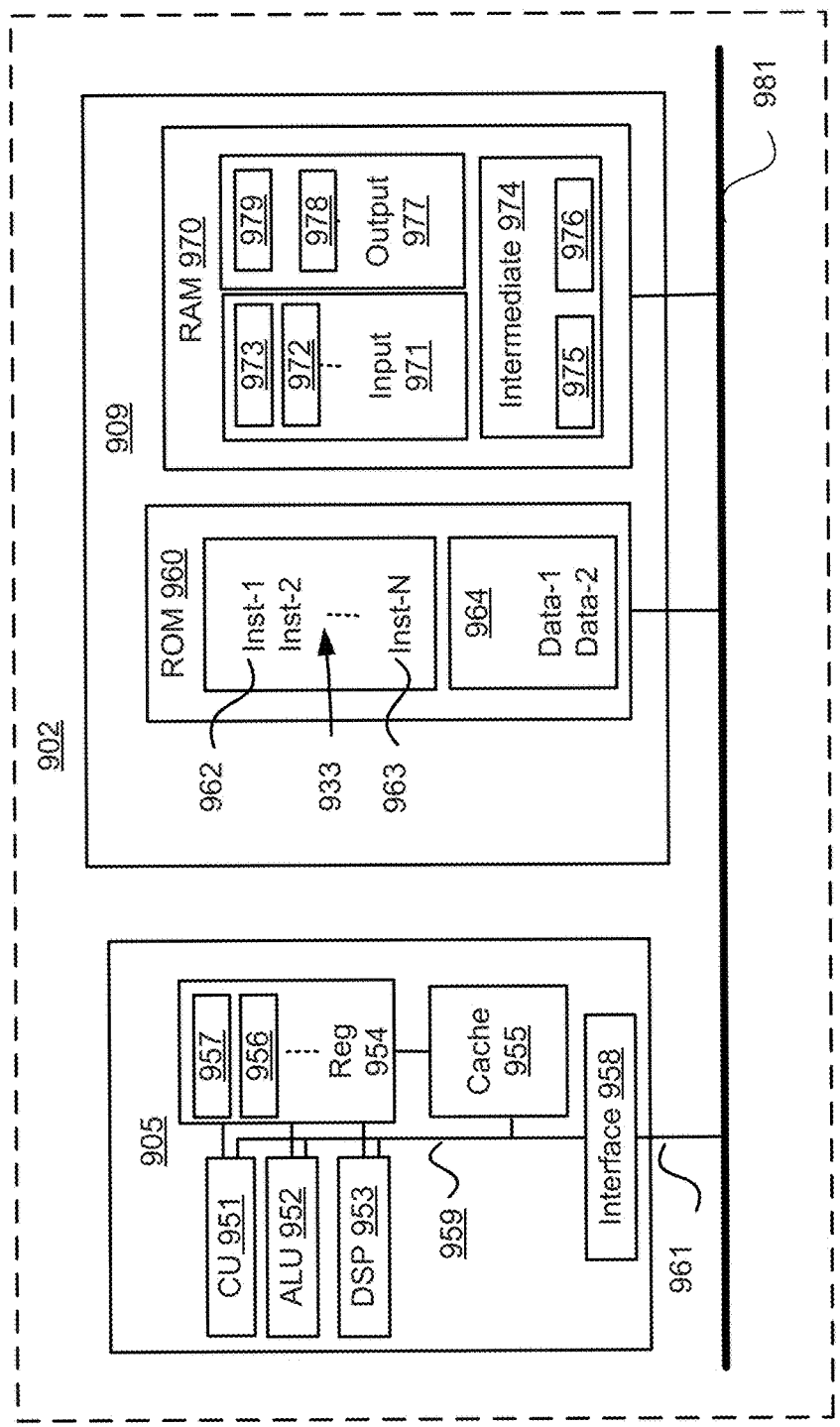

The methods described are typically implemented using an electronic device such as a tablet device, a smartphone, or the like, having a display suited to real-time video reproduction. FIGS. 9A and 9B collectively form a schematic block diagram of a general purpose electronic device 901 including embedded components, upon which the methods of annotating a portion of a video stream to be described are desirably practiced. The electronic device 901 is in the example described hereafter is a tablet device. However, in other implementations the electronic device 901 may be another type of electronic device in which processing resources are limited, for example a mobile phone, a portable media player, or a smartphone, or an electronic image capture apparatus such as a camera or video camera. Nevertheless, the methods to be described may also be performed on higher-level devices such as desktop computers, server computers, and other such devices with significantly larger processing resources.

As seen in FIG. 9A, the tablet device 901 comprises an embedded controller 902. Accordingly, the tablet device 901 may be referred to as an "embedded device." In the present example, the controller 902 has a processing unit (or processor) 905 which is bi-directionally coupled to an internal storage module 909. The storage module 909 may be formed from non-volatile semiconductor read only memory (ROM) 960 and semiconductor random access memory (RAM) 970, as seen in FIG. 9B. The RAM 970 may be volatile, non-volatile or a combination of volatile and non-volatile memory.

The tablet device 901 includes a display controller 907, which is connected to a video display 914, such as a liquid crystal display (LCD) panel or the like. The display controller 907 is configured for displaying bitmap and graphical images on the video display 914 in accordance with instructions received from the embedded controller 902, to which the display controller 907 is connected.

The tablet device 901 also includes user input devices 913 which are typically formed by keys, a keypad or like controls. In the example described herein, the user input devices 913 includes a touch sensitive panel physically associated with the display 914 to collectively form a touch screen. For ease of reference, the combination of the display 1914 and user input devices 1913 are referred to as a touch screen 1914 in the arrangements described, consistent with that type of structure as found in traditional tablet devices, such as the Apple iPad™. The touch screen 914 may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 9A, the tablet device 901 also comprises a portable memory interface 906, which is coupled to the processor 905 via a connection 919. The portable memory interface 906 allows a complementary portable memory device 925 to be coupled to the tablet device 901 to act as a source or destination of data or to supplement the internal storage module 909. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The tablet device 901 also has a communications interface 908 to permit coupling of the device 901 to a computer or communications network 920 via a connection 921. The connection 921 may be wired or wireless. For example, the connection 921 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the tablet device 901 is configured to perform some special function. The embedded controller 902, possibly in conjunction with further special function components 910, is provided to perform that special function. For example, where the device 901 is a digital camera, the components 910 may represent a lens, focus control and image sensor of the camera. The special function component 910 is connected to the embedded controller 902. As another example, the device 901 may be a mobile telephone handset. In this instance, the components 910 may represent those components required for communications in a cellular telephone environment. Where the device 901 is a portable device, the special function components 910 may represent a number of encoders and decoders of a type including Joint Photographic Experts Group (JPEG), (Moving Picture Experts Group) MPEG, MPEG-1 Audio Layer 3 (MP3), and the like. The special function components 910 may also relate to operation of the touch screen 914.

The methods described hereinafter may be implemented using the embedded controller 902, where the processes of FIGS. 2 to 4 and 7 may be implemented as one or more software application programs 933 executable within the embedded controller 902. The tablet device 901 of FIG. 9A implements the described methods. In particular, with reference to FIG. 9B, the steps of the described methods are effected by instructions in the software 933 that are carried out within the controller 902. The software instructions may be formed as one or more code modules, each for performing one or more particular tasks. The software may also be divided into two separate parts, in which a first part and the corresponding code modules perform the described methods and a second part and the corresponding code modules manage a user interface between the first part and the user.

The software 933 of the embedded controller 902 is typically stored in the non-volatile ROM 960 of the internal storage module 909. The software 933 stored in the ROM 960 can be updated when required from a computer readable medium or via communication with a server computer such as a cloud computer. The software 933 can be loaded into and executed by the processor 905. In some instances, the processor 905 may execute software instructions that are located in RAM 970. Software instructions may be loaded into the RAM 970 by the processor 905 initiating a copy of one or more code modules from ROM 960 into RAM 970. Alternatively, the software instructions of one or more code modules may be pre-installed in a non-volatile region of RAM 970 by a manufacturer. After one or more code modules have been located in RAM 970, the processor 905 may execute software instructions of the one or more code modules.

The application program 933 is typically pre-installed and stored in the ROM 960 by a manufacturer, prior to distribution of the tablet device 901. However, in some instances, the application programs 933 may be supplied to the user encoded on one or more CD-ROM (not shown) and read via the portable memory interface 906 of FIG. 9A prior to storage in the internal storage module 909 or in the portable memory 925. In another alternative, the software application program 933 may be read by the processor 905 from the network 920, or loaded into the controller 902 or the portable storage medium 925 from other computer readable media. Computer readable storage media refers to any non-transitory tangible storage medium that participates in providing instructions and/or data to the controller 902 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 901. Examples of transitory or non-tangible computer readable transmission media that may also participate in the provision of software, application programs, instructions and/or data to the device 901 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 933 and the corresponding code modules mentioned above may be executed to implement one or more graphical user interfaces (GUIs) to be rendered or otherwise represented upon the display 914 of FIG. 9A. Through manipulation of the user input device 913 (e.g., the keypad), a user of the device 901 and the application programs 933 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 9B illustrates in detail the embedded controller 902 having the processor 905 for executing the application programs 933 and the internal storage 909. The internal storage 909 comprises read only memory (ROM) 960 and random access memory (RAM) 970. The processor 905 is able to execute the application programs 933 stored in one or both of the connected memories 960 and 970. When the tablet device 901 is initially powered up, a system program resident in the ROM 960 is executed. The application program 933 permanently stored in the ROM 960 is sometimes referred to as "firmware". Execution of the firmware by the processor 905 may fulfill various functions, including processor management, memory management, device management, storage management and user interface.

The processor 905 typically includes a number of functional modules including a control unit (CU) 951, an arithmetic logic unit (ALU) 952, a digital signal processor (DSP) 953 and a local or internal memory comprising a set of registers 954 which typically contain atomic data elements 956, 957, along with internal buffer or cache memory 955. One or more internal buses 959 interconnect these functional modules. The processor 905 typically also has one or more interfaces 958 for communicating with external devices via system bus 981, using a connection 961.

The application program 933 includes a sequence of instructions 962 through 963 that may include conditional branch and loop instructions. The program 933 may also include data, which is used in execution of the program 933. This data may be stored as part of the instruction or in a separate location 964 within the ROM 960 or RAM 970.

In general, the processor 905 is given a set of instructions, which are executed therein. This set of instructions may be organised into blocks, which perform specific tasks or handle specific events that occur in the tablet device 901. Typically, the application program 933 waits for events and subsequently executes the block of code associated with that event. Events may be triggered in response to input from a user, via the user input devices 913 of FIG. 9A, as detected by the processor 905. Events may also be triggered in response to other sensors and interfaces in the tablet device 901.

The execution of a set of the instructions may require numeric variables to be read and modified. Such numeric variables are stored in the RAM 970. The methods described use input variables 971 that are stored in known locations 972, 973 in the memory 970. The input variables 971 are processed to produce output variables 977 that are stored in known locations 978, 979 in the memory 970. Intermediate variables 974 may be stored in additional memory locations in locations 975, 976 of the memory 970. Alternatively, some intermediate variables may only exist in the registers 954 of the processor 905.

The execution of a sequence of instructions is achieved in the processor 905 by repeated application of a fetch-execute cycle. The control unit 951 of the processor 905 maintains a register called the program counter, which contains the address in ROM 960 or RAM 970 of the next instruction to be executed. At the start of the fetch execute cycle, the contents of the memory address indexed by the program counter is loaded into the control unit 951. The instruction thus loaded controls the subsequent operation of the processor 905, causing for example, data to be loaded from ROM memory 960 into processor registers 954, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 933, and is performed by repeated execution of a fetch-execute cycle in the processor 905 or similar programmatic operation of other independent processor blocks in the tablet device 901.

The tablet device 901 is in communication with an image capture apparatus 990. The image capture apparatus is a digital video camera in the example described, referred to hereafter as the camera 990. In other implementations, the image capture apparatus 990 may be any other device capable of recording digital video. The tablet device 901 is in communication with the camera 990 via a network such as the network 920, via a connection 991. In an alternative embodiment, the tablet device 901 is integrally formed with the image capture device 990.

Figure 2:
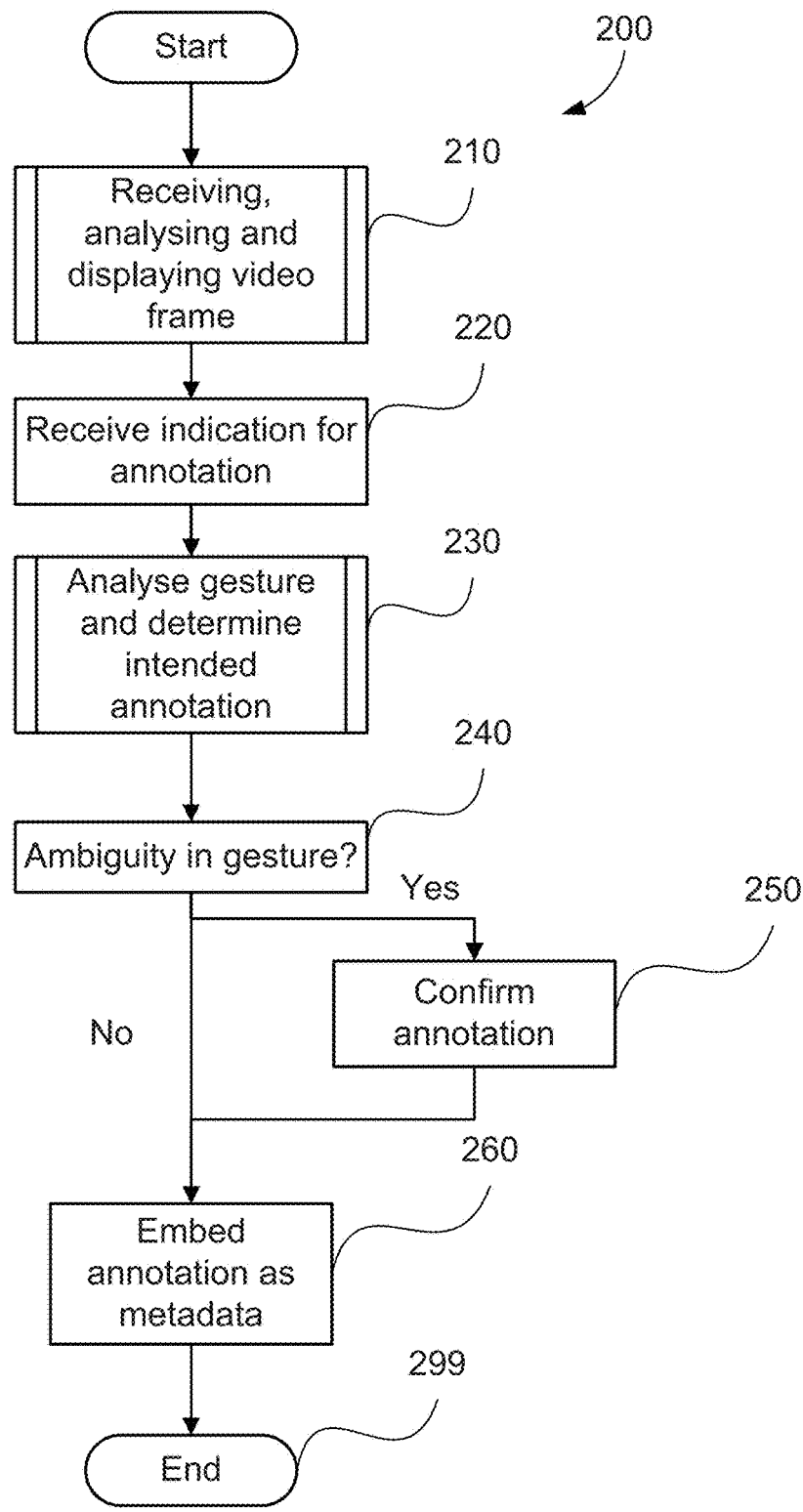
FIG. 2 shows a method of applying an annotation to a portion of a video sequence during capture of the video sequence.

A method 200 of applying an annotation to a portion of a video sequence is shown in FIG. 2. The method 200 may be implemented by one or more submodules of the application 933 stored on the memory 906, and controlled by execution of the processor 905. The method 200 is executed during live review of a video sequence, that is during capture of the video sequence.

The method 200 executes as the video sequence is captured (recorded) by the camera 990. The method 200 starts at a step 210 when the video sequence is received by the tablet device 901. The video sequence is received at the step 210 in real-time from the camera 990. The step 210 is executed on the processor 905 to analyse and display the video sequence in near real-time to a user of the tablet, in this example the director, on the touch screen 914. A method 300 of receiving, analysing and displaying a video frame of the video sequence, as executed at step 210, is described in relation to FIG. 3.

At any time during display of the video sequence by the touch screen 914, the director is able to initiate an annotation by executing one of a defined set of gestures to operate the touch screen 914. The method 200 executes on the processor 905 to progress to a step 220 upon operation of the touch screen. At the step 220, the touch screen 914 operates to receive the gesture executed by the director in real-time during capture of the video sequence. In receiving the gesture, the tablet device 901 operates to receive an indication from the director.

The method 200 executes on the processor 905 to progress to a step 230. At step 230, based on the gesture received at step 220, and monitored spatial and temporal attributes of the captured video sequence determined in step 210, the application 933 executes to determine semantics for the annotation by analysing the gesture and determining the intended annotation. The semantics for the annotation may include annotation type, annotation subject, and the temporal and spatial extent for the annotation. A method 400 of analysing the gesture and determining the intended operation, as executed at the step 230, is described hereafter with reference to FIG. 4.

The method 200 executes on the processor 905 to progress to a step 240. The step 240 executes to determine, based on the how specific the gesture is, whether the intended annotation determined in the step 230 is ambiguous. If the step 240 determines that the possible annotation is not ambiguous ('No' at step 240), no confirmation from the director is required, and the method 200 executes to progress to step 260.

If the indicated annotations are determined to be ambiguous ('Yes' at step 240), the method 200 executes to progress to a step 250. On execution of the step 250, the director is requested to confirm the annotation. The step 250 may also include presenting alternate possible annotations and/or additional semantic information to the director on the touch screen 914 for selection. In this event, the alternative annotation options are presented on the touch screen 914 as menu items. In other implementations, other user interface methods may be used to present alternative annotation options to the director. Once the application 933 has executed to receive confirmation from the director, the method 200 executes to progress to the step 260. In yet other implementations, a flag may be added as an annotation if the gesture is found to be ambiguous in step 250. In some implementations the step 240 is optional and the method 200 progresses directly from step 230 to step 260.

The step 260 executes to apply the determined annotation to a portion of the video sequence by associating the annotation with the portion of the video sequence. The step 260 executes to embed the determined annotation as metadata by storing the determined annotation and associated semantics as metadata in an output video stream. Alternatively, the determined annotation is stored as an annotation record associated with the video sequence. The output stream, the associated metadata stream, and the annotation record may be stored on the memory 909. The application 933 may in some implementations execute to display the annotation on the display screen 914 briefly to indicate to the director that the annotation has been stored. Other forms of feedback such as audio feedback may also be used in the step 200 to indicate to the director that the annotation has been stored. In embedding the determined annotation as metadata, the step 260 operates to apply the annotation to a portion of a selected one of the signals of step 210.

Figure 3:
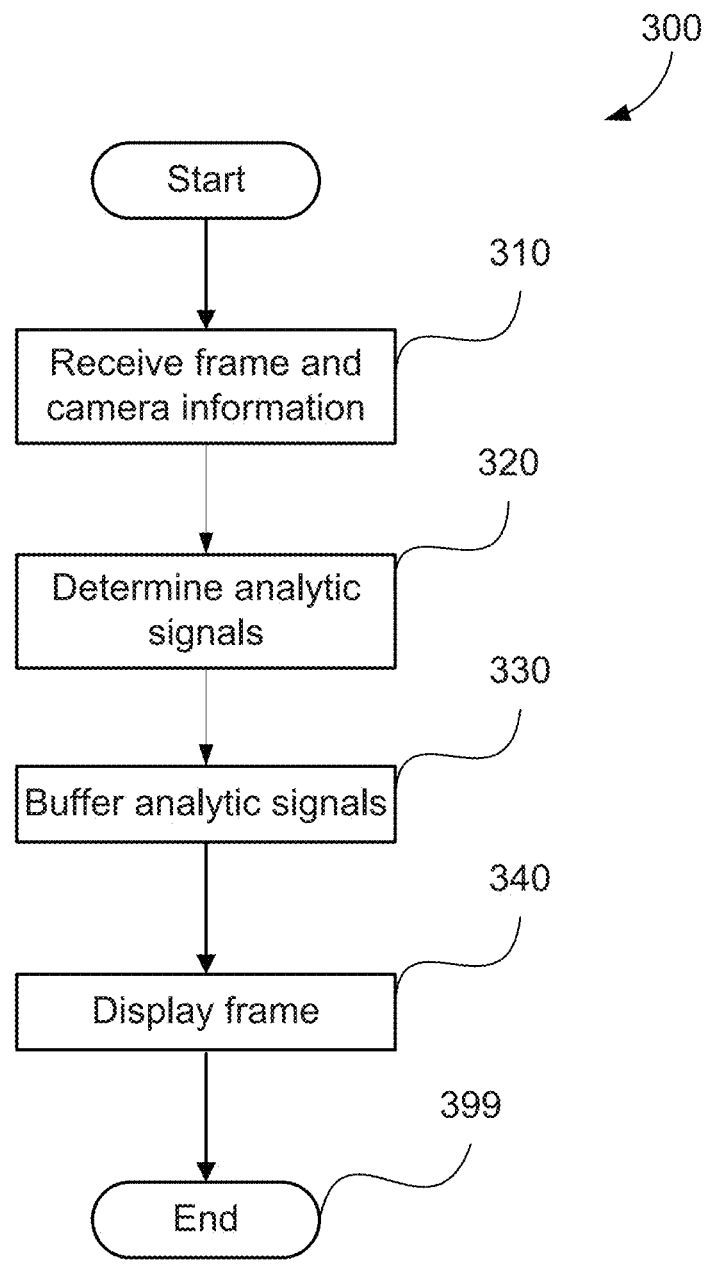
FIG. 3 shows a method of receiving analysing and displaying a video frame as used in FIG. 2.
Figure 4:
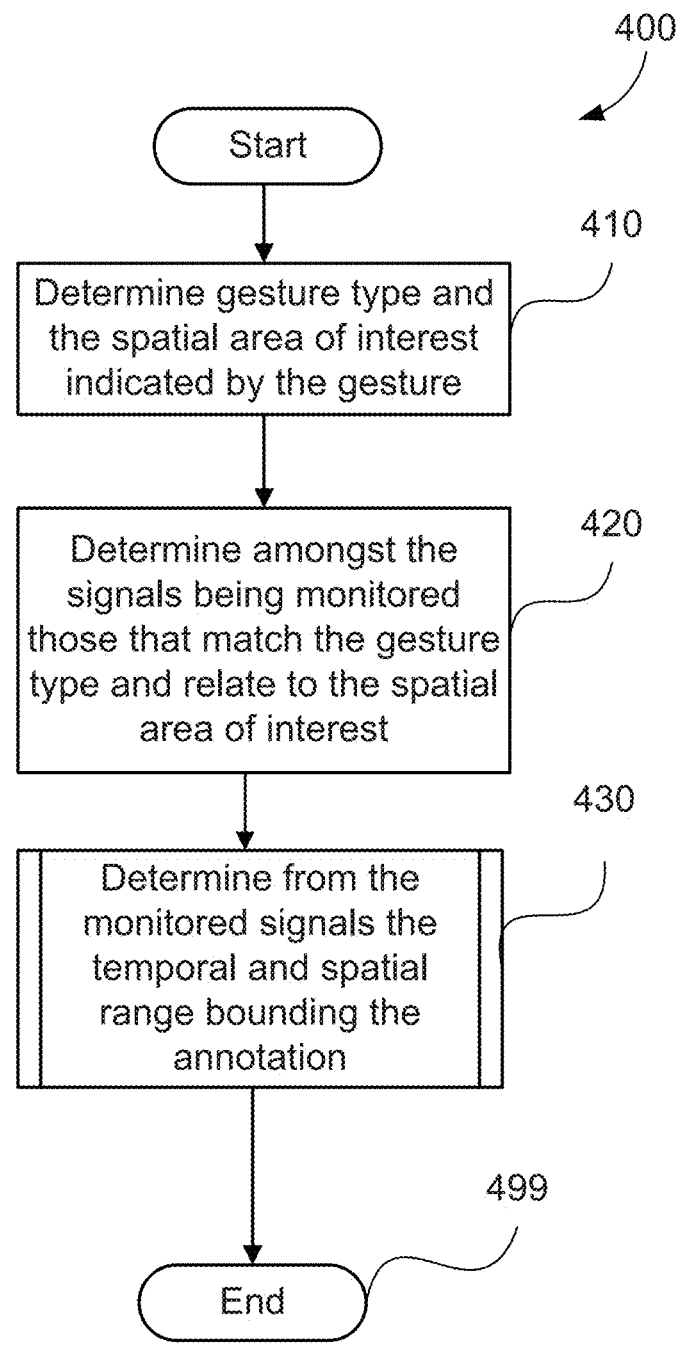
FIG. 4 shows a high level block diagram of a method of analysing a gesture an determining an intended annotation as used in FIG. 2.

The method 300 of receiving, analysing and displaying a frame of the video sequence to the director, as executed at step 210, is now described in more detail in FIG. 3. The method 300 may be implemented by one or more submodules of the application 933 stored on the memory 906, and controlled by execution of the processor 905.

The method 300 of receiving, analysing and displaying video frames executes continuously in real-time as the video sequence is captured. The method 300 is described in relation to a single video frame of the video sequence. The method 300 starts at a step 310. The step 310 executes to receive the video frame and camera 990 information in real-time during capture of the video sequence. The camera information may include a state change in one or more parameters of the camera 990.

The method 300 executes to progress to a step 320. A set of analytic signals associated with the video frame are determined in real-time in execution of the step 320.

The method 300 executes to progress to the 330. Execution of the step 330 buffers the analytic signals so that there is a history, for a predetermined time window, of the value for each signal. In buffering the analytic signals, the application 933 executes known buffering techniques, such as storing the analytical signals temporarily on the memory 909. The method 300 executes to progress to step 340. In execution of the step 340, subsequently, or in parallel to the buffering step 330, the video frame is displayed to the director on the touch screen 914. In executing the step 330, the method 300 operates to monitor the analytic signals in real-time during capture of the video sequence.

The analytic signals determined in the step 320 describe specific properties of video data associated with the video frame. The analytic signals can relate to a status of the camera 990, such as camera motion, zoom and frame rate. The analytic signals can relate to the captured video stream. Examples of analytic related to the captured video stream include analysis of appearance (such as lighting, colour, blur, edge density, corner density, face appearance), movement (such as character motion such as walking and running, scene motion) and sound (such as ambient noise, dialog). The analytic signals typically comprise signals stored in relation to regions of the frame (such as grids, described in relation to FIG. 5) or may be global signals relating to the entire video frame, e.g., audio signals, light signals, and the like.

The camera 990 status signals can be derived in at least two ways. In one implementation, the camera device status signals are derived directly from camera 990 operating parameters and read directly from the camera 990 using an appropriate application programming interface (API). Alternatively, camera status information can be derived directly or indirectly from the metadata relating to the camera 990 embedded in the video stream received at the step 210. Examples of camera operating signals include the aperture and shutter speed settings and whether or not a zoom or focus pull is being operated.

Methods used to determine the analytic signals by processing the received video stream are known. Some implementations execute to analyse the video stream for motion characteristics (speed and direction), dominant chromaticity, focus (high frequency energy), and face likelihood. For example, motion speed and direction in two dimensions (2D) can be determined using a block matching technique employed in video compression. Such an implementation is useful due to efficiency and existence of hardware support for block matching techniques. However, other similar techniques for estimating optical flow could equally be employed. Chromaticity is determined by considering the distribution of blue-difference (Cb) and red-difference (Cr) chroma components values for an image region. Both motion and colour have signals that are multi-dimensional. While multi-dimensional distance measures are common, the description herein is restricted to discussion of the further analysis of signals to a one dimension (1D) example for simplicity and clarity. Computation and comparisons of 1D signals are also computationally cheaper to achieve for real-time performance Also, the focus quality signal can be generated, as a 1D signal, by measuring the Root mean square (RMS) output of a band pass or high pass filter applied to the relevant image area. Similarly, face detection is typically performed using a statistical process that provides a confidence of and given image area containing a face. Other signals, derived from the camera 990, are inherently 1D. Such signals include a status of operation of focus and zoom as well as numeric values of various capture parameters such as aperture, shutter, exposure value, etc. Some signals type can be associated with, and monitored independently for, various spatial regions of the frame in execution of step 330. For example, the exposure signal is measured at a grid of points. In such implementations, the step 330 stores data for spatial regions corresponding to portions of the video frame, which can be used later to match a spatial area of interest indicated by the annotation gesture of step 220. Matching a spatial area of interest to a portion of a frame is described with reference to FIG. 6A and FIG. 6B.

Audio content of the video sequence may be monitored under execution of the method 300 to track beginning and ending of a conversation. Examples of audio signals may include, but are not limited to, silence in speech, voice pitch, and the like. Conventional speech-to-text conversion methods may be used to convert the audio content to text. Natural language processing techniques may be used to identify sentence boundaries to determine the conversation durations.

The analytic signals that are monitored at the step 330 can be customised based on the production type that is determined at the pre-production stage 120. For example, to support the precise timing of TV commercial shots, signals associated with typical actions may be employed. Examples of signals associated with typical actions include, but are not limited to, walking, hand shaking, running, and the like. To support such implementations, the method 300 allows monitoring of the different signal types to be enabled or disabled by the director using know techniques such as presentation of a selectable menu of signals. The method 300 also, in some implementations, allows customisation of a region in which the analytic signals are monitored. For example, a director may pay more attention to a character motion in the centre of the video frame and disable monitoring outside the centre region. Resultant execution of the step 330 to monitor motion only in the centre of the video frame may provide a method of reducing determination of analytic signals while still allowing the director to make annotations on the character motion of importance.

A rate of change of any given signal is also monitored in a similar manner and made available to the annotation semantic determination step 230.

Execution of the method 300 is repeated for each video frame of the video sequence received. Execution of the method 300 therefore runs in real-time at the same rate as the video frames are captured. Depending on the frame rate and the processing capabilities of the tablet device 901, analytic signals may in some implementations be determined on a subset of the received frames, such as every second frame or every third frame. Such reduction in the rate of the analytic signal calculation can be used to ensure the video frames are displayed in the step 340 at the capture rate and/or with minimum lag.

Referring back to FIG. 2, step 210 is followed in execution of the method 200 with step 220 when the director initiates an annotation by making a gesture. In the arrangements described, the gesture is made on the touch screen 914. While use of the touch screen 914 is particularly suited to the arrangements described, other methods for receiving an indication may nevertheless be appropriate (e.g. a mouse drag, a joystick, hovering of fingers, engaging of buttons, and the like) as means for receiving an indication, provided such can be associated with a particular spatial portion of the video frame. Both single-touch and multi-touch gestures may be used by the director to operate with the touch screen 914. Examples of gestures may include, but are not limited to tapping, dragging, flicking, swiping, double tapping, pinching, and shaking.

The method 200 progresses from step 220 to step 230. The method 400 of analysing the gesture input and determining the annotation and the annotation semantics, as executed at step 230, is now described in detail with reference to FIG. 4. The method 400 may be implemented by one or more submodules of the application 933 stored on the memory 906, and controlled by execution of the processor 905.

Execution of the method 400 starts with step 410. The step 410 executes to determine the gesture type. The gesture type is used to identify a spatial area of interest associated the gesture. The spatial area of interest relates to a spatial area of the video frame to which the gesture is applied. In alternative implementations, identification of the spatial area of interest maybe completed using rules associated with a particular gesture type.

The method 400 executes to progress from step 410 to step 420 once the gesture type and spatial area of interest are determined The step 420 executes to select monitored signals related to the spatial area of interest, for use in selecting one of the monitored signals that matches the received gesture.

Once the signal is selected, the method 400 executes to progress to step 430. The step 430 executes to determine a temporal and spatial range bounding the annotation. The temporal and spatial range of the annotation relate to a temporal portion of the selected signal. A method 700 of determining the temporal and spatial range of the annotation, as executed at step 430, is described in relation to FIG. 7. In an alternative embodiment, only the temporal range bounding the annotation is determined.

Figures 5A, 5B:
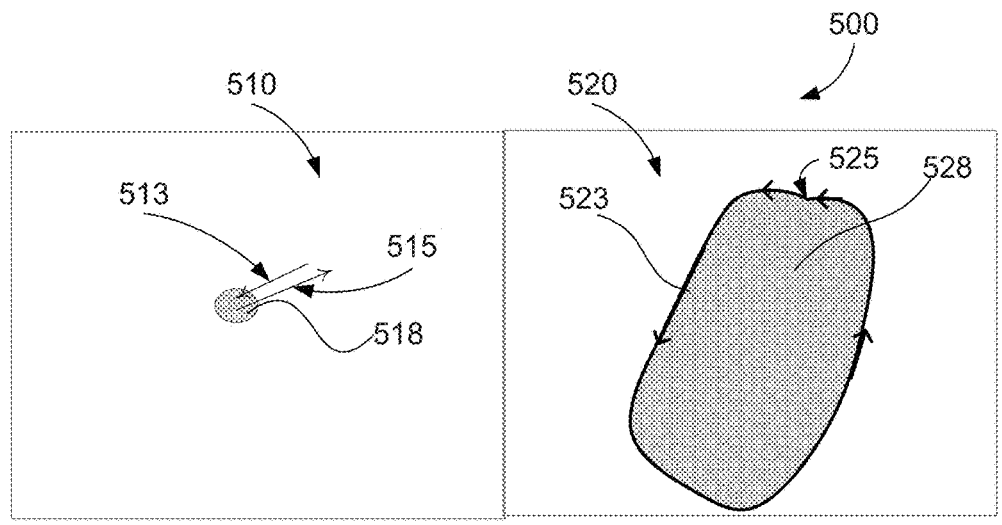
FIGS. 5A-5D depict a number of gestures receivable in the method of FIG. 2 and resulting identified spatial areas of interest.

Gestures received in the step 220 are used to determine an annotation type as well as indicating the spatial area of interest. FIGS. 5A to 5D show examples 500 of gestures that might be executed by the director and the corresponding spatial area of interest that each gesture indicates. The gestures are detected when the director touches a surface of the touch screen 914. FIG. 5A shows a representation of a tap gesture 510. The tap gesture 510 is executed when a finger is pressed down to touch the screen 914, as indicated by an arrow 513 and, afterwards, the finger is lifted, as indicated by an arrow 515. Execution of the tap gesture 510 results in a region 518 where the tap gesture was made being determined as the spatial area of interest. That is, the spatial area of interest is the area of the touch screen 914 to which the gesture is applied.

FIG. 5B shows a representation of a drag gesture 520 having an outline 523 being specified by a finger drag which returns to a drag start point 525. An area 528 enclosed by the outline 523 is identified to be the corresponding spatial area of interest.

Figures 5C, 5D:
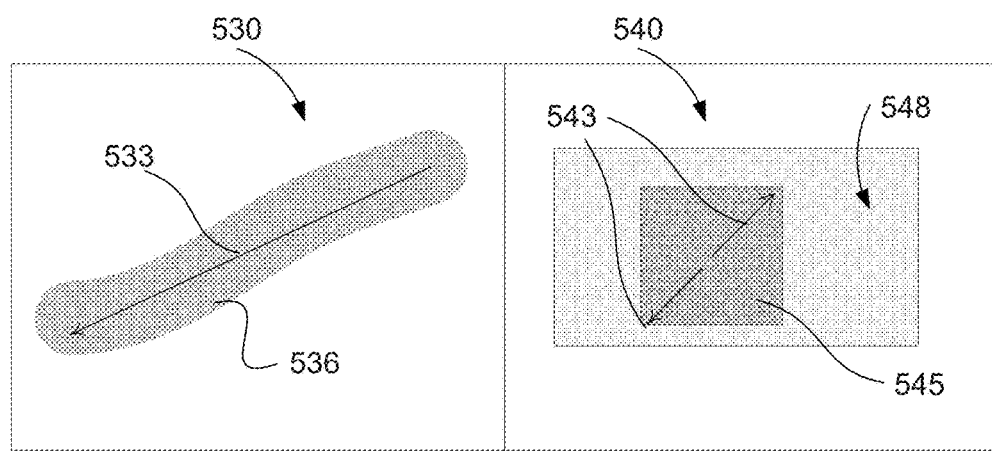

FIG. 5C shows a representation of a drag gesture 530 along a diagonal line 533. The drag gesture 530 identifies a spatial area of interest 536 along the line 536.

FIG. 5D shows a representation of a multi-touch pinch open gesture 540. Two fingers are separated while touching the touch screen 914 and moved apart as indicated by a line 543. End positions of the two fingers define corners of a rectangular space defining a spatial area of interest 545.

In some implementations, the spatial area of interest is used to determine a region of interest associated with the gesture. The region of interest includes the spatial area of interest in addition to areas of the video frame which have content associated with a subject of the spatial area of interest. An example of determining a region of interest is discussed in relation to FIG. 6B. A determined region of interest is used in the manner to the spatial area of interest in selecting a temporal portion of one of the monitored signals for annotation.

The spatial area of interest is used to determine annotation area of the annotation at step 430.The annotation area is the spatial area of the video frame to which the annotation is applied. A determined region of interest may also be used in a similar manner the spatial area of interest in determining the annotation area.

In some implementations, the spatial area of interest determined from by the gesture will be the same as the annotation area. In other implementations, the spatial area of interest will only identify a part of the annotation area. For example, the drag gestures 520 and 530 of FIGS. 5A and 5B respectively define spatial areas of interest. The corresponding annotation area can be extended to regions inside the video image frame which share similar texture content. Texture content refers to information about the spatial arrangement of colour or intensities in a region of the video frame. Texture content can be described using different techniques. Such techniques may include but not limited to edge detection which determines the number of edge pixels in a specified region, co-occurrence matrices which captures the spatial relations of similar grey tones, and autocorrelation function which describes the repetitive patterns inside the region.

In yet further implementations, the annotation area can be extended to regions inside the video image frame which share similar motion content with the spatial area of interest indicated by the drag gestures 520 and 530 of FIGS. 5B And 5C. Such motion content is related to movements inside the video frame, which may be quantified by an estimate of a velocity either at each point in the video frame or in 3D scenes or of the camera device 990. In another example, the pinch open gesture 540 of FIG. 5D matches a "zoom in" where the annotation area is a full screen 548. However, while spatial area of interest determined from the final finger separation only identifies the area 545 of the touch screen 914. To differentiate the spatial area of interest 545 and the extended annotation 548, the application 933 may prompt the director for confirmation of the desired annotation area, as at the step 240 of FIG. 2. In an alternative implementation, a default option can be set so that method 200 operates to choose a default annotation area. For example, the method 430 may select the full video image as the default annotation area for gestures like pinching open, depending on the rules relating to the gesture.

Once the spatial area of interest has been determined, the method 400 progresses to the step 420. Execution of the step 420 includes selection of a plurality of monitored signals for consideration based on the identified area of interest. As described hereinbefore, a particular signal types can be monitored independently at various spatial regions of the video frame. Such a signal type may be considered as a local signal type. Local signal types contrast to global signal types such as ambient noise, dialog, camera frame rate, and the like which are monitored for the entire video frame.

Figure 6A:
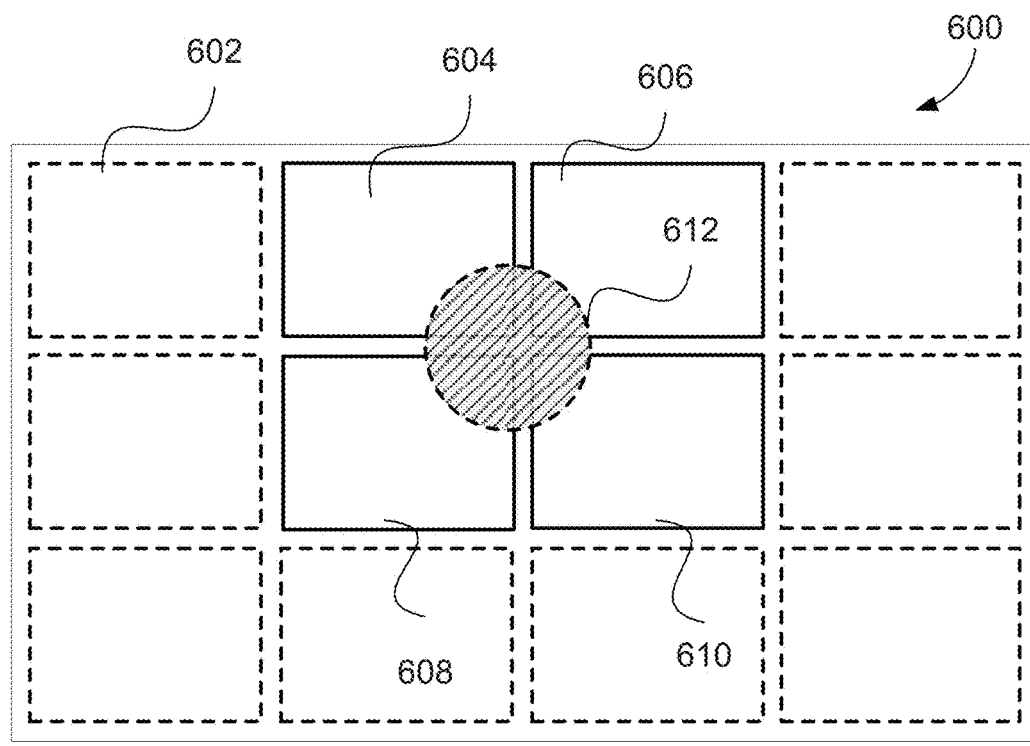
FIGS. 6A and 6B show a number of examples of selecting monitored signals by using a spatial area of interest identified from a gesture.
Figure 6B:
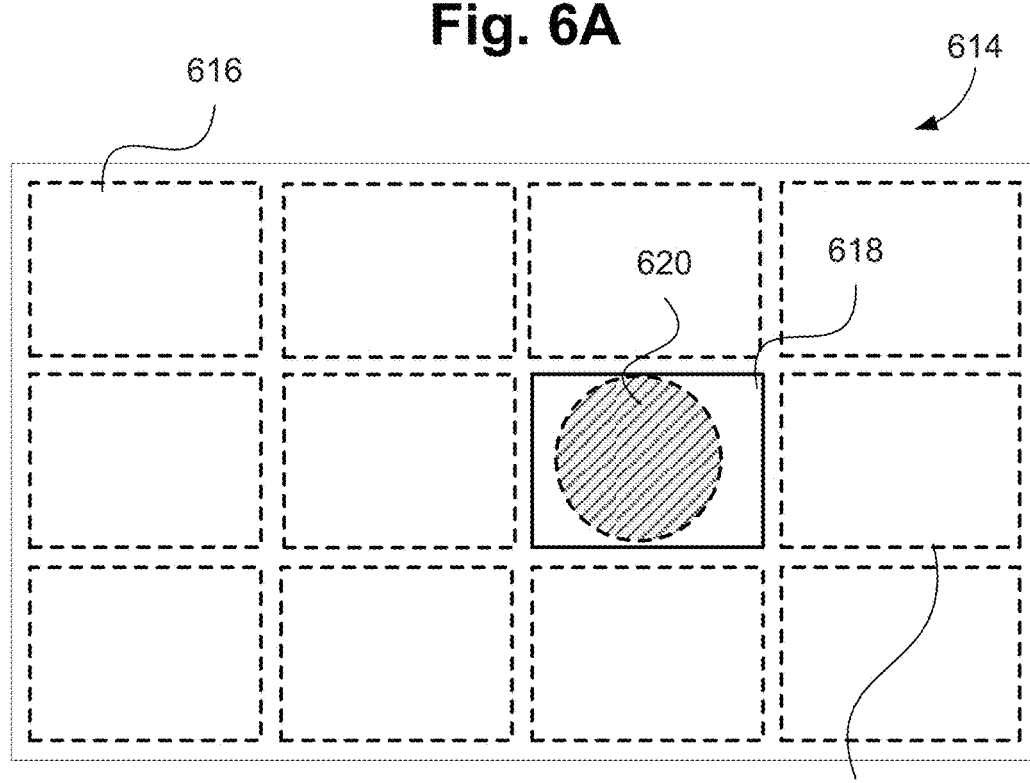

FIGS. 6A to 6C show examples of a selection process executed in step 420 depending on the identified spatial area of interest.

FIG. 6A shows a video frame 600. The video frame 600 is divided into equal-sized grids, such as grids 602, 604, 606, 608 and 610. A size of the grids 602 to 610 may be defined as a minimum size for which computation of a certain signal type can support. For example, determining exposure value for a grid size of minimum 4-by-4 pixels may be suitable for computation by the tablet device 901. For each of the grids 602-610 a plurality of local signal types are monitored independently of one another. The director executes a gesture 612 on the touch screen 914 indicating the identified spatial area of interest. In FIG. 6A, the corresponding spatial area of interest 612 intersects with four local grids inside the frame 600, namely the grids 604, 606, 608 and 610. The resultant annotation may be associated with signal types defined within one or more of the grids 604, 606, 608 and 610. Accordingly the step 430 executes to examine signals monitored inside the grids 604, 606, 608 and 610.

FIG. 6B shows another video frame 614. Similarly to the video frame 600, the video frame 614 is divided into grids including grids 616 and 618. In FIG. 6B, an identified spatial area of interest 620 is contained within a single grid 620. As a result, only the monitored signals in grid 620 are associated with the annotation.

The step 420 selects a number of local signal types by filtering out signals not associated with the identified spatial area of interest. Global signal types, however, cannot be excluded, and are by default taken into consideration.

In some implementations, the spatial area of interest is used to determine a region of interest. For example, the director uses the gesture of 620 to touch a display of a portion of blue car on an otherwise grey background (not shown) on the touch screen 914. Such results in the spatial area of interest being contained within the grid 620. However, if the blue car extends across the video frame from the grid 620 into a grid 622, the grid 622 includes content associated with the content of the spatial area of interest as the grid shares chromatic properties (blue colour) of the remainder of blue car. In such implementations, the application 933 executes to identify shared content of the grids 620 and 622 associated with the gesture. The application 933 determines the region of interest to relate to the grids 620 and 622. In other implementations, a region of interest may be identified according to rules associated with received gestures—e.g., a double tap on the touch screen indicates to determine the region of interest from the identified spatial area of interest.

A resultant annotation area may be identified by including grid coordinate references, such as for the grids 620 and 622, in applying the annotation at step 260.

FIGS. 6C(i) to 6C(iv) show examples of how monitored signals are selected from the determined grids. In FIGS. 6C(i) to 6C(iv), four types of signals are monitored in the grids identified using the identified spatial region of interest. The monitored signals are a motion signal 623 shown in FIG. 6C(i), an exposure signal 624 shown in FIG. 6C(ii), a face likelihood signal 626 shown in FIG. 6C(iii), and an ambient noise level 628 shown in FIG. 6C(iv). The signals 623, 624 and 626 are local signals, while the ambient noise level signal 628 is a global signal.

In FIGS. 6C(i) to 6C(iv) the signals 623, 624, 626 and 628 are monitored over 7 seconds. A gesture is detected on the surface of the touch screen 914 displaying the video sequence in real-time at 7 seconds, as indicated by a marker 630. An examination of temporal variation of signals within a predefined time window (for example, 2 seconds) indicates that changes occur on the motion, exposure, and face likelihood signals 623, 624 and 626 respectively. The motion signal 623 varies at between 6 seconds and 7 seconds as indicated by a marker 632. The exposure signal 624 changes around 5.3 seconds as indicated by a marker 634, while the face likelihood signal 626 alters at 6 seconds as indicated by a marker 636. The ambient noise signal 628 fluctuates over 7 seconds but no relatively significant change is observed. Accordingly, the ambient noise signal 628 is not considered relevant to the annotation. A signal considered relevant to an annotation is also referred to as an active signal.

Out of the three local active signals 623, 624 and 626, the change of the motion signal 623 is the most recent signal change near the time of the gesture 630. As a result the motion signal 623 is most likely the signal that triggered the gesture. Accordingly, the motion signal 623 is selected as the signal for the annotation. Alternatively, selection of the signal for annotation can occur by choosing a signal which was changing at the time that the gesture was made.

The arrangements described use monitored signals related to the spatial area of interest to determine select a temporal portion of a signal of the video frame to annotate. The selected temporal portion may relate to one of the monitored signals related to the spatial area of interest, or to one of the global signals of the video frame.

Once the gesture type and spatial area of interest have been determined, and some active signals have been selected, the step 420 execute to match the gesture type, the spatial area of interest and the selected signals with one of the monitored signals to determine the annotation subject.

The particular gesture made by the director can be used in execution of the step 430 to identify which annotation subjects that director is annotating by matching the type of gesture to the signal. Table 1 shows an example of the signals and the gesture which identifies it.

junction with a face likelihood signal will have a related "face out of focus" annotation. Such a situation occurs when the region of interest includes consistent blur and face likelihood signals. The blur signal indicates that the outline region being blurry and the face likelihood signal shows that the region of interest has high likelihood of being a face. Accordingly the combined subject may be "face out of focus".

Figure 7:
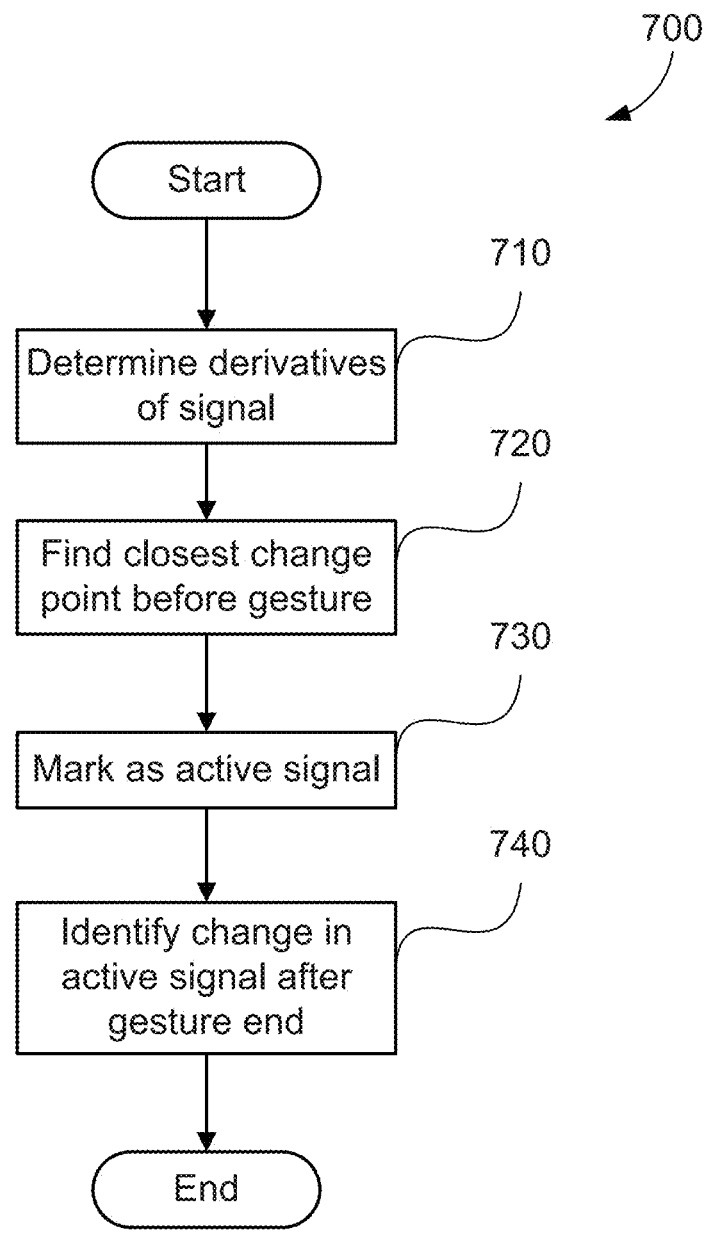
FIG. 7 shows a method determining spatial and temporal bounding for the annotation as used in FIG. 4.

The method 700 for determining the temporal and spatial range for an annotation, as executed at the step 430, is now described with reference to FIG. 7. The method 700 may be implemented by one or more submodules of the application 933 stored on the memory 906, and controlled by execution of the processor 905.

Prior to execution of the method 700, the spatial extent of the gesture and the relevant signals has been determined at the step 420. The method 700 starts at step 710. The step 710 executes to consider changes in the relevant monitored signals. Changes in the monitored signals are determined by examining a derivative of each monitored signal. The derivative may be cached as a separate signal history stored in the memory 909, or determined as required at step 710.

TABLE 1

| Signal | Description | Possible Annotation Subject | Gesture |
| --- | --- | --- | --- |
| Zoom | Zoom in or zoom out. This can be determined from the camera attributes. | Zoom too quick, too slow, too far etc. | Pinch close for zoom out and pinch open for zoom in |
| Pan | This can be determined from object tracking or camera motion attributes. | Uneven pan, too slow, too fast, too far etc. | Drag |
| Tempo | This can be determined from the rate of changes in scene motion | Too fast/slow; match tempo to other shot | Drag a zigzag |
| Dialog | This can be determined from audio processing or a combination of audio processing and face monitoring. | Dialog volume uneven, too soft, loud, requires specific processing enhancement | Press or drag following character |
| Character Motion | This can be determined from face or body detection and background tracking | Inconsistent framing when the camera is tracking the motion etc. | Drag following character |
| Blur | This can be determined from the level of high frequency detail and contrast within the specified regions. | Inaccurate focus, contrast enhancement required etc. | Press or drag outline |
| Exposure | This can be determined from the intensity histogram | Region underexposed?, more/less contrast in region etc. | Press or drag outline |
| Colour | This can be determined from the 2D chroma histogram | Insufficient colour contrast, needs to be warmer/colder etc. | Press or drag outline |
| Face Likelihood | This can be determined by applying a face detector to the outlined region. The response of the detector is the likelihood of any face existence in the region | Faces to emphasize, blurry face | Outline |

In some implementations, the annotation subjects contain relative attributes such as "too quick", "too slow", "too loud", etc. This may be realized by comparing the signal values with predetermined thresholds. For example, if the exposure threshold is set to 0.5, then any exposure value smaller than 0.5 will be considered as underexposed.

As indicated in Table 1, the spatial area of interest specified by the gesture might be associated with a number of such signals. If the signals have a consistent state, an annotation can be created for the spatial area of interest. To determine the annotation subjects, the method 200 may prompt the director with alternate possible annotation subjects associated with those signals, as described in relation to the step 250. In the example of exposure an annotation of the region that is underexposed can be generated.

Signal subjects can also be combined to derive more meaningful semantics. For example, a blur signal in con- The method 700 executes on the processor 905 to progress to a step 720. The step 720 executes to determine a closest time prior to the time at which the gesture was received which exhibited a transition larger than a threshold amount for each relevant monitored signal. A transition larger than the threshold amount identifies a change point in a signal.

The method 700 executes on the processor 905 to progress to a step 730. The step 730 executes by prioritising the identified change points to determine an active signal. The step 730 executes to mark the time of the transition for the active signal as a start time for the annotation.

The method 700 executes on the processor 905 to progress to a step 740. In execution of the step 740 the active signal is monitored to determine a subsequent transition time. The step 740 executes to use the subsequent transition time as an end time for the annotation. The determination of the start and end times at the step 740 need not be based solely on the value of signals. In some implementations, the start and the end times may be determined, either solely or in part, by an elapsed time. For example, if no suitable signal transition or key value can be identified within a defined interval of the gesture time then a start time may be determined as being a fixed interval of time prior to the gesture. Similarly, if a transition corresponding to an end of annotation is not determined within a predetermined period of time, or if a new annotation gesture is initiated, then the end time for the annotation can be determined to be a fixed time after the start. The start and end times of the annotation define a temporal portion of the selected active signal.

In other implementations, additional information such as the annotation type and the production type may be taken into account when making such determinations. Further implementations may combine using a predetermined time interval with a signal trigger by weighting the size of the signal transition that would be interpreted as the beginning or end of an annotation. In such instances, weighting would be performed so that outside of a pre-determined time interval, even very small transitions would be interpreted as significant. Analysing the transition of the active signals over time represents analysing a temporal variation measure of each of the active signals. In some implementations, the temporal variation measure relate to the greatest relative change in signal over a period of time. In assigning start and end times of the active signal, the step 740 determines a temporal range of the active signal used for the annotation. In finding the closest change point at step 720, marking the active signal at step 730 and identifying the change in the active signal at step 740, the method 700 operates to select a portion of one of the monitored signals based up the spatial area of interest and a temporal variation measure in at least one of the plurality of monitored signals.

Figure 8A:
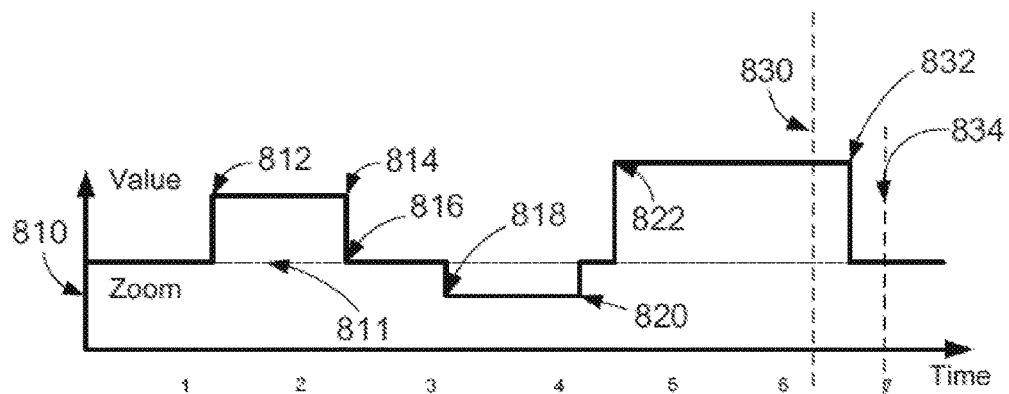
FIG. 8A-8D show a number of examples of signals used to determine temporal extents for an annotation.

FIGS. 8A to 8D show examples of how a temporal range is assigned to the annotation. FIG. 8A shows a plot of a monitored zoom signal 810 over 7 seconds. When the camera 990 starts recording the signal 810 is at a level 811 at which the camera 990 is not zooming After about 1 second (812) the camera 990 "zooms in" at a steady rate until a 2 second mark (814) at which time the zooming stops (816). A "zoom out" occurs between 3 seconds (818) and 4 seconds (820). Then between 4.5 seconds (822) and 6.7 seconds (832) a steady "zoom in" is shown in the signal 810. At 6.3 seconds, shown by a marker 830, an annotation gesture is received at the electronic device 901. Although the method 300 has been monitoring the state of zooming and recognising the transitions over the past 6 seconds (812, 814, 818, 820 and 822), only a record of the latest zoom in transition (822) at 4.5 seconds will be maintained for annotation processing at 6.3 seconds (marker 830). The gesture at 6.3 seconds indicated by the marker 830 is a pinch open gesture (see FIG. 5D, 540). This gesture is compatible with the "zoom in" and a zoom change annotation type is determined. As the "zoom in" relates to the whole screen the area of interest is determined to be the whole screen. At 6.7 seconds (832) the "zoom in" stops and the method 700 determines the interval from 4.25 seconds (822) to 6.7 seconds (832) as the temporal range for the annotation.

Alternatively, if the gesture occurs at 7 seconds (marker 834) (instead of 6.3 seconds at the marker 830), the same annotation will be applied because the time interval 4.25 seconds (832) to 6.7 seconds (834) is within a time threshold. A threshold of 300 milliseconds may for example be used given that the average human reaction time is roughly 250 milliseconds. Other settings for the threshold may be used that may depend on the signal type or a personalised system setting.

Figure 8B:
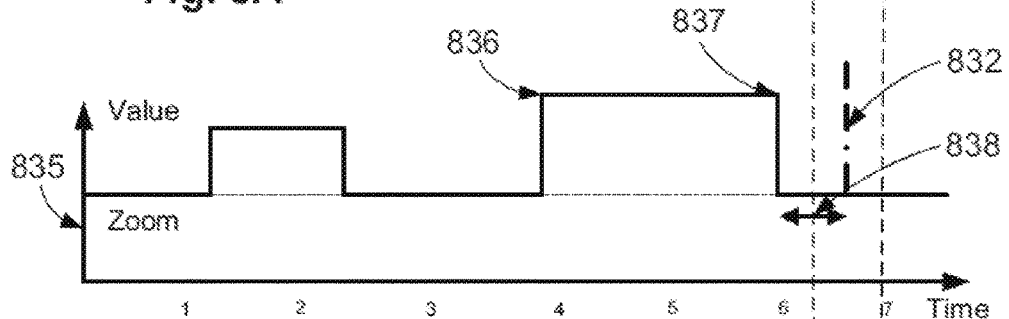

Use of a threshold is demonstrated in a plot 835 of FIG. 8B. The plot 835 has a zoom in recorded at 3.9 seconds (836) to 6 seconds (837). If a gesture indicating a zoom in is made at time 6.3 seconds (830), the gesture results in the annotation with temporal range 3.9 seconds (836) to 6 seconds (837) being applies. Any gesture after the time 6.3 seconds (838) will not associate an annotation with the temporal range 3.9 (836) to 6 seconds (837). The step 430 will execute to examine other signals whose timeout occurs after the time indicated by 837.

Figure 8C:
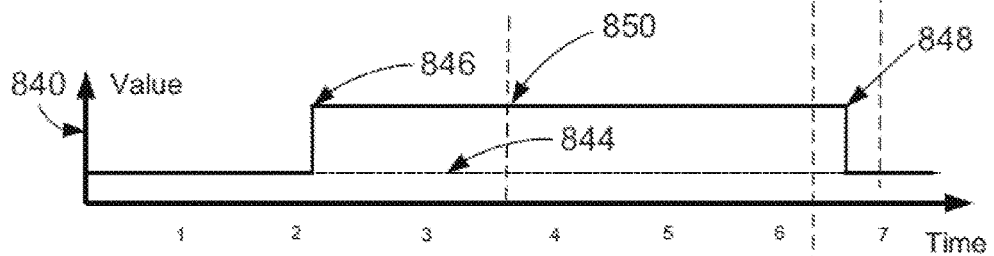

FIG. 8C shows a signal 840 having example transitions for a character motion signal. If more than 1 character is displayed on the touch screen 914 the method step 330 of FIG. 3 will monitor multiple motion signals to monitor each of the individual characters. Initially, the character of the signal 840 is stationary and a zero motion level (844) is recorded. The character moves with steady motion speed between 2 seconds (846) and 6.6 seconds (848). A drag gesture, (e.g. FIG. 5C, 530) is received that follows the path of the character, the drag gesture starting at time 3.6 seconds (850) and ending at time 6.3 seconds (830). Such is determined to relate to the character motion signal, and an annotation generated is applied with a temporal range from 2 seconds (846) to 6.6 seconds (848). Alternatively, a drag gesture that is initiated between time 6.3 seconds (830) and 7 seconds (834) and that follows the path or part of the path taken by that character's movement will result in the same annotation being applied.

Figure 8D:
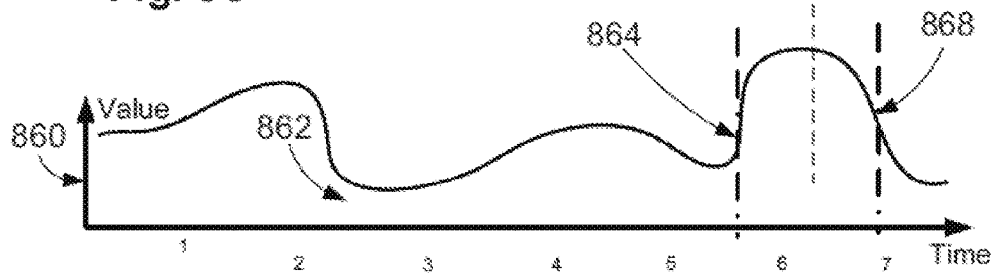

In the signals 810, 835 and 840 of FIGS. 8A, 8B and 8C respectively, the monitored signals have discrete values. In some instances, however, the underlying raw signal may be continuous. By processing the raw signal using techniques such as threshold crossing, the continuous signal can be converted to discrete values resulting in step function similar to the ones shown in the signal 810 of FIG. 8A and the character motion signal 840 of FIG. 8C. In other implementations, the signal being monitored will not be characterised by discrete states. A signal 860 of FIG. 8D is an example of a signal with non-step transitions. In the example of FIG. 8D, the average intensity is monitored independently for a matrix of grids on the screen. If an absolute value of the rate of change of the signal exceeds a defined threshold as occurs at 5.5 seconds (864) then this time is a candidate for a start of a temporal range. A tap gesture (FIG. 5A, 510) in the same grid where the transition (864) occurs will result in application of an annotation. The start of the temporal range of the annotation will be time 5.5 seconds (864). The end of the temporal range of the annotation will be when the signal 860 returns below the threshold at 7 seconds (868). In other words the temporal region of the annotation is the time when the signal 860 has an absolute rate of change greater than defined threshold.

Once the spatial and temporal range bounding for an annotation have been determined by execution of the step 430, information relating to the annotation may be stored as metadata and associated with the video sequence, as described in relation to FIG. 2, step 260.

The relevant information of the annotation may be stored as metadata in the form of <annotation semantics, temporal extent, spatial extent >. The metadata can be stored as an XML file as an appendix to the video sequence file. Alternatively, both the metadata and the video sequence data can be stored as container format files, such as the Material eXchange Format (MXF) files. The MXF is a wrapper format which supports a number of different streams of coded video data, together with a metadata wrapper which describes the material contained within the MXF file.

The arrangements described are applicable to the media processing industries and particularly for the digital cinematography industries. In an example use, the director uses the gesture of 530 in relation to FIG. 5C to follow motion of a character due to inconsistent framing in tracking that motion (see, e.g., Table 1). The application 933 executes to apply an annotation to a portion of the video sequence according to the methods described above. For example, the application 933 executes to select a portion of the character signal 840 of FIG. 8C and applies an annotation to that portion of the video sequence. At the post-production stage 140, the annotation is accessible to the director upon accessing the stored video sequence. The methods described allow the director to view video sequences and add annotations during real-time capture of the video sequence. The director does not need to access a report book or other manual means of storing annotations or notes. As the stored annotation information is associated with the video frame, loss of information between the production and pre-productions stages may be reduced.

The described arrangements can be used in reviewing live takes rather than playback of video sequences, in contrast to some methods of annotating video sequences. In contrast to some methods of annotating video sequences, the arrangements described do not require manual input of the temporal portion or area of the annotation. Rather, the temporal region and annotation area may be determined from the spatial region of interest and a temporal variation measure in each of the monitored signals. Unlike some other methods of annotating video sequences, the director does not have to infer start and end times of the annotation temporal region. Rather, the arrangements described use the monitored signals to determine the temporal region of the annotation. Further, the arrangements described consider the spatial area of interest of the received gesture or indication.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method implemented by a processor to apply an annotation to a portion of a video sequence, the method comprising:
    receiving the video sequence in real-time during capture of the video sequence;
    monitoring, in real-time, a plurality of signals associated with the video sequence, wherein the plurality of monitored signals include at least two monitored signals of the following types of signals: an image capture apparatus motion signal, an image capture apparatus zoom signal, an image capture apparatus frame rate signal, a video image lighting signal, a video image colour signal, a video image blur signal, a video image edge density signal, a video image corner density signal, a video image face appearance signal, a video image character motion signal, a video image object motion signal, a video image ambient noise signal, and a video image dialog signal, wherein one of the at least two monitored signals is a type of signal that is different from a type of signal of the remainder of the at least two monitored signals;
    receiving an indication associated with a spatial area of interest of at least one frame during capture of the video sequence;
    selecting, from the at least two monitored signals, a temporal portion of one of the at least two monitored signals for annotation,
    wherein selecting the temporal portion for annotation is based upon each of the following: (i) the spatial area of interest, (ii) a temporal variation measure in one of the at least two monitored signals, and (iii) the one of the at least two monitored signals having a signal change nearest to a time of subsequently receiving the indication, wherein the signal change is a most recent signal change of one of the at least two monitored signals relative to a different signal change of the remaining of the at least two monitored signals;
    applying an annotation to a portion of the video sequence corresponding to the selected temporal portion; and
    storing the annotation in an annotation record associated with the video sequence.

2. The method according to claim 1, further comprising determining a region of interest of the at least one frame of the video sequence using the spatial area of interest,
    wherein selecting the temporal portion for annotation further is based on (iv) the region of interest.

3. The method according to claim 1, further comprising determining a region of interest of the at least one frame of the video sequence using the spatial area of interest,
    wherein selecting the temporal portion for annotation further is based on (iv) the region of interest, and
    wherein the region of interest includes the spatial area of interest and a portion of the at least one frame having content associated with content of the spatial area of interest.

4. The method according to claim 1, wherein each of the at least two monitored signals is associated with a spatial region of the at least one frame.

5. The method according to claim 1, wherein each of the at least two monitored signals is associated with a spatial region of the at least one frame, and the spatial region of the at least one frame is a portion of the video frame.

6. The method according to claim 1, wherein each of the at least two monitored signals is associated with a spatial region of the at least one frame, and the spatial region of the at least one frame is the entire video frame.

7. The method according to claim 1, wherein the indication is a touch gesture received by a touch screen displaying the video sequence.

8. The method according to claim 1 wherein the selected temporal portion starts at a transition time of the selected monitored signal.

9. The method according to claim 1, wherein the selected temporal portion starts at a transition time of the selected monitored signal, and the selected temporal portion ends at a further transition of the selected monitored signal.

10. The method according to claim 1, further comprising determining a category of the annotation from the selected temporal portion.

11. The method according to claim 1, wherein a subject of the annotation is identified in the at least one frame by matching a type of the indication to the selected temporal portion.

12. The method according to claim 1, wherein an area of the annotation includes the spatial area of interest.

13. The method according to claim 1, wherein an area of the annotation includes the spatial area of interest and a region of the at least one frame having similar texture content to the spatial area of interest.

14. The method according to claim 1, wherein an area of the annotation includes the spatial area of interest and a region of the at least one frame having a similar motion signature to the spatial area of interest.

15. A non-transitory computer-readable medium having computer program stored thereon to perform a method implemented by a processor to apply an annotation to a portion of a video sequence, the method comprising:
receiving the video sequence in real-time during capture of the video sequence;
monitoring, in real-time, a plurality of signals associated with the video sequence, wherein the plurality of monitored signals include at least two monitored signals of the following types of signals: an image capture apparatus motion signal, an image capture apparatus zoom signal, an image capture apparatus frame rate signal, a video image lighting signal, a video image colour signal, a video image blur signal, a video image edge density signal, a video image corner density signal, a video image face appearance signal, a video image character motion signal, a video image object motion signal, a video image ambient noise signal, and a video image dialog signal, wherein one of the at least two monitored signals is a type of signal that is different from a type of signal of the remainder of the at least two monitored signals;
receiving an indication associated with a spatial area of interest of at least one frame during capture of the video sequence;
selecting, from the at least two monitored signals, a temporal portion of one of the at least two monitored signals for annotation,
wherein selecting the temporal portion for annotation is based upon each of the following: (i) the spatial area of interest, (ii) a temporal variation measure in one of the at least two monitored signals, and (iii) the one of the at least two monitored signals having a signal change nearest to a time of subsequently receiving the indication, wherein the signal change is a most recent signal change of one of the at least two monitored signals relative to a different signal change of the remaining of the at least two monitored signals;
applying an annotation to a portion of the video sequence corresponding to the selected temporal portion; and
storing the annotation in an annotation record associated with the video sequence.

16. An apparatus to apply an annotation to a portion of a video sequence, the apparatus comprising:
at least one processor coupled to memory storing instructions that, when executed by the at least processors, cause the apparatus to perform operations including:
receiving the video sequence in real-time during capture of the video sequence,
monitoring, in real-time, a plurality of signals associated with the video sequence, wherein the plurality of monitored signals include at least two monitored signals of the following types of signals: an image capture apparatus motion signal, an image capture apparatus zoom signal, an image capture apparatus frame rate signal, a video image lighting signal, a video image colour signal, a video image blur signal, a video image edge density signal, a video image corner density signal, a video image face appearance signal, a video image character motion signal, a video image object motion signal, a video image ambient noise signal, and a video image dialog signal, wherein one of the at least two monitored signals is a type of signal that is different from a type of signal of the remainder of the at least two monitored signals,
receiving an indication associated with a spatial area of interest of at least one frame during capture of the video sequence,
selecting, from the at least two monitored signals, a temporal portion of one of the at least two monitored signals for annotation,
wherein selecting the temporal portion for annotation is based upon each of the following: (i) the spatial area of interest, (ii) a temporal variation measure in one of the at least two monitored signals, and (iii) the one of the at least two monitored signals having a signal change nearest to a time of subsequently receiving the indication, wherein the signal change is a most recent signal change of one of the at least two monitored signals relative to a different signal change of the remaining of the at least two monitored signals,
applying an annotation to a portion of the video sequence corresponding to the selected temporal portion, and
storing the annotation in an annotation record associated with the video sequence.

17. A system to apply an annotation to a portion of a video sequence, the apparatus comprising:
at least one processor coupled to memory storing instructions that, when executed by the at least processors, cause the apparatus to perform operations including:
receiving the video sequence in real-time during capture of the video sequence,
monitoring, in real-time, a plurality of signals associated with the video sequence, wherein the plurality of monitored signals include at least two monitored signals of the following types of signals: an image capture apparatus motion signal, an image capture apparatus zoom signal, an image capture apparatus frame rate signal, a video image lighting signal, a video image colour signal, a video image blur signal, a video image edge density signal, a video image corner density signal, a video image face appearance signal, a video image character motion signal, a video image object motion signal, a video image ambient noise signal, and a video image dialog signal, wherein one of the at least two monitored signals is a type of signal that is different from a type of signal of the remainder of the at least two monitored signals,
receiving an indication associated with a spatial area of interest of at least one frame during capture of the video sequence,
selecting, from the at least two monitored signals, a temporal portion of one of the at least two monitored signals for annotation,
wherein selecting the temporal portion for annotation is based upon each of the following: (i) the spatial area of interest, (ii) a temporal variation measure in one of the at least two monitored signals, and (iii) the one of the at least two monitored signals having a signal change nearest to a time of subsequently receiving the indication, wherein the signal change is a most recent signal change of one of the at least two monitored signals relative to a different signal change of the remaining of the at least two monitored signals,
applying an annotation to a portion of the video sequence corresponding to the selected temporal portion, and storing the annotation in an annotation record associated with the video sequence.

18. The method according to claim 1, wherein selection of a temporal portion of one of the at least two monitored signals is further based upon a time threshold representing a human reaction time.

19. The method according to claim 1, wherein each step after receiving the video sequence in real-time during capture of the video sequence is performed as the video sequence is being captured.

20. The method according to claim 1, wherein, after selecting the temporal portion and before applying the annotation, the method further comprises receiving a conformation from a user to use the annotation in response to sending a query of whether the annotation is ambiguous.

21. The method according to claim 1, further comprising disabling monitoring outside a centre region of the video sequence such that determination of analytic signals is reduced while allowing applying the annotations to the portion of the video sequence corresponding to the selected temporal portion.

22. The method according to claim 1, wherein one of the at least two monitored signals is a local signal and another of the at least two monitored signals is a global signal.

23. The method according to claim 1, wherein the at least two monitored signals are the video image blur signal and the video image face appearance signal, the method further comprising combining the video image blur signal and the video image face appearance signal to obtain an annotation that is different from annotations from each individual signal of the at least two monitored signals.

24. The method according to claim 1, further comprising determining a closest time prior to a time at which the indication was received which exhibited a transition larger than a threshold amount for each of the at least two monitored signals, wherein the transition larger than the threshold amount identifies a change point in a signal.

25. The method according to claim 24, wherein, after finding the closest change point, marking an active signal, and identifying change in the active signal, selecting includes selecting a portion of one of the at least two monitored signals based up the spatial area of interest and a temporal variation measure in at least one of the at least two monitored signals.

26. The method according to claim 1, further comprising determining a temporal region and an annotation area from the spatial area of interest and a temporal variation measure in each of the at least two monitored signals such that a user does not have to infer start and end times of the annotation temporal region.

* * * * *